July 23, 1957  E. S. DUNN  2,800,597
FLUID TIGHT SEAL FOR ELECTRIC MOTORS AND GENERATORS
Filed Sept. 27, 1954
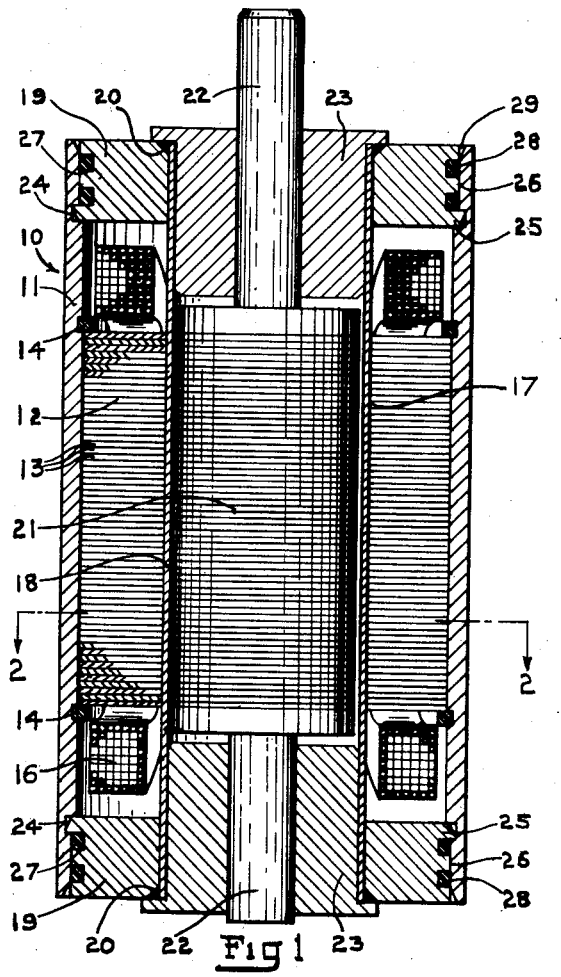
Fig 1
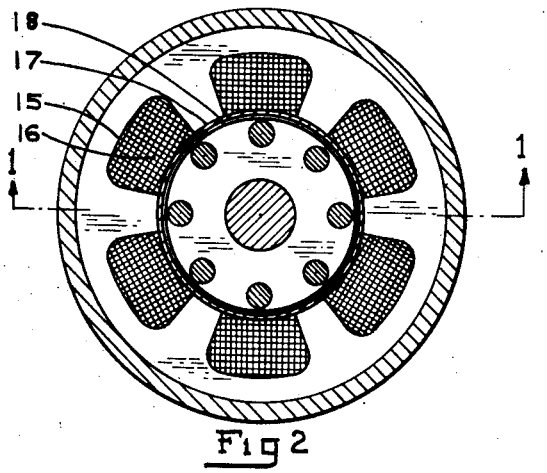
Fig 2
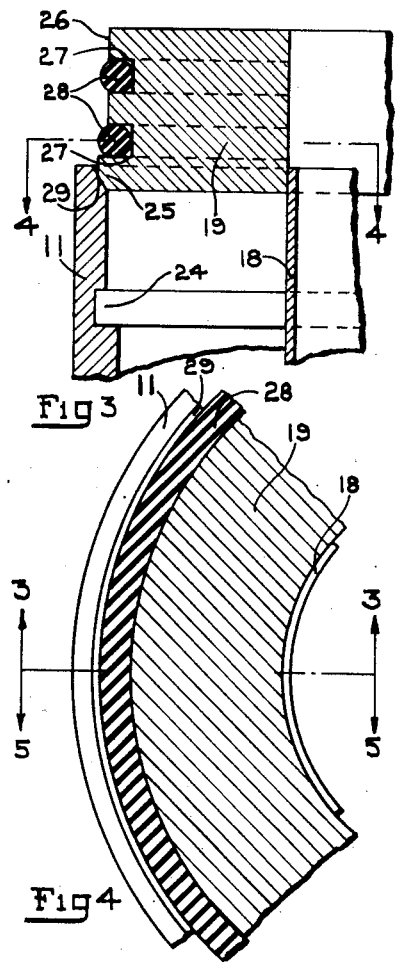
Fig 3
Fig 4
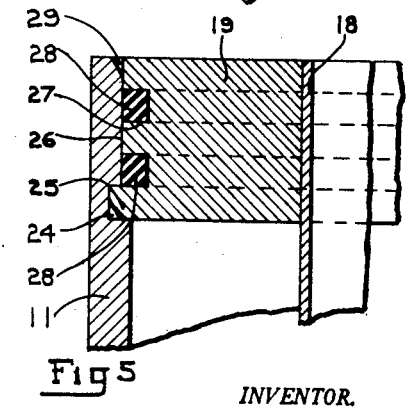
Fig 5
INVENTOR.
EUSTACE S. DUNN

United States Patent Office 2,800,597
Patented July 23, 1957

2,800,597
FLUIDTIGHT SEAL FOR ELECTRIC MOTORS AND GENERATORS

Eustace S. Dunn, Piedmont, Calif.

Application September 27, 1954, Serial No. 458,354

3 Claims. (Cl. 310—86)

This invention relates to electric motors of the type in which the stator and windings are sealed for protection against the action of the fluid or the atmosphere in which the motor is operated. Motors of this type are used, for example, in submersible pumps which are, in effect, turbine pumps with a close-coupled electric motor, both pump and motor being immersed in water, oil, or other fluid to be pumped.

In the construction of motors of the aforementioned type it is preferred practice to enclose the stator and the stator windings in a protective cylindrical housing and to seal the bore of the stator within which the rotor is mounted, by means of a tubular lining sleeve so that the fluid cannot enter the slots containing the windings.

The enclosure within which the stator and windings are sealed is completed by annular end pieces joined to the tubular lining sleeve and the protective cylindrical housing by watertight joints. It has been preferred practice for the joint between the annular end pieces and the protective cylindrical housing to be soldered or brazed on, to form a seal by compressing a rubber gasket between the annular end piece and an additional member attached to the wall of the cylindrical housing.

The first of these methods is uncertain in its results, while the second is difficult to produce satisfactorily as well as costly.

This invention makes possible the use of the annular end piece above to provide a simple and effective watertight seal, without the aid of any additional securing or pressing element, and at the same time to lock the annular end ring against any longitudinal displacement under the conditions of vibration and variation of temperature in which the motor operates.

According to the invention, the cylindrical housing is provided with an internal peripheral groove and the annular end piece is provided with an outwardly extending radial flange which fits into the groove. Two rectangular grooves in the periphery of the annular end piece contain rings of resilient material of circular cross section so proportioned in relation to the dimensions of their containing grooves that when the periphery of the annular end piece is pressed firmly against the internal surface of the cylindrical housing, the resilient rings are deformed so as to fill the grooves whereby radial pressure of the rings forms a watertight seal. The insertion of the protruding ridge on the annular end piece into the groove in the cylindrical housing serves to lock the end piece against longitudinal movement, and the friction of the resilient rings against angular movement.

The various objects, features and advantages of this invention will appear more fully from the detailed description which follows, accompanied by drawings showing, for the purpose of illustration, a preferred embodiment of the invention. The invention also consists in certain new and original features of construction and combination of elements hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in conjunction with the accompanying drawings forming a part of it in which:

Figure 1 is a sectional view showing the essential elements of a motor incorporating the invention with the rotor in elevation, the section being taken on the line 1—1 of Figure 2.

Figure 2 is a transverse section of the structure shown in Figure 1, the section being taken on the line 2—2 in Figure 1.

Figure 3 is an enlarged vertical section of a portion of Figure 1 before assembly, the section being taken on the line 3—3 of Figure 4.

Figure 4 is a transverse section of the portion shown in Figure 3, the section being taken on the line 4—4 of Figure 3.

Figure 5 is a vertical section of the portion shown in Figure 3 after assembly, the section being taken on the line 5—5 of Figure 4.

In the following description and in the claims, various details will be identified by specific names for convenience. These names, however, are intended to be as generic in their application as the art will permit. Corresponding reference characters refer to corresponding parts in the several figures of the drawings.

In the drawings accompanying, and forming part of the specification, certain specific disclosure of the invention is made for the purpose of explanation of broader aspects of the invention, but it is understood that the details may be modified in various respects without departure from the principles of the invention and that the invention may be applied to other structures than the one shown.

Referring to Figures 1 and 2, the motor 10 is enclosed in an outer pressure resistant cylindrical housing 11 of bronze or stainless steel. The stator 12 comprises a stack of stator laminations 13 assembled in a conventional manner and held in the outer shell by retaining rings 14.

The stator laminations are blanked out to provide radially extending slots 15 for the stator windings 16.

The stator laminations have a central cylindrical bore 17 within which a tubular lining sleeve 18 is fitted. The ends of and between the cylindrical housing and of the lining sleeve are closed by annular end pieces 19.

The separate stator enclosure is further made liquidtight by solder joints 20 between the annular end pieces 19 and the lining sleeve 18.

A rotor 21 is mounted concentric with the stator and within the central bore formed by the lining sleeve. The rotor may be of the conventional squirrel-cage type of construction. The rotor shaft 22 is mounted in suitable bearings 23 which also act as plugs for the ends of the lining sleeve 18.

Referring to Figures 3, 4 and 5, the joint between the annular end pieces 19 and the external housing 11, is constructed in the following manner:

The inner periphery of the cylindrical housing 11 is provided with an internal groove 24 adjacent each end, the depth of the groove being of the order of .040 of an inch. A preferred material for the cylindrical housing is stainless steel of which the degree of hardness is such as to give a high yield point, so that when the cylinder is substantially expanded by radially outward pressure it returns to its original diameter when the expanding pressure is removed.

Each annular end piece 19 is provided with a radial peripheral flange 25 of the same width and diameter as the groove 24 in the cylindrical housing. The remaining periphery 26 of the annular end piece is a sliding fit within the internal diameter of the cylindrical housing, except that two radially inward grooves 27 are formed in its periphery. One such groove immediately adjoins the peripheral ridge 25. The second such groove is separated from the first by a relatively thin wall of the metal of the end ring. Each of these grooves contains a resilient ring 28, a preferred material being natural or synthetic rubber, the cross section of the ring being circular and of the same diameter as the width of the grooves 27. The radial depth of the grooves is such that the cross-sectional area of the groove is the same as or slightly more than the cross-sectional area of the resilient ring.

With the resilient rings in their grooves the annular end ring is pressed longitudinally into the open end of the cylindrical housing which is thereby expanded by the larger diameter of the peripheral ridge. When the ridge reaches the internal groove in the wall of the cylindrical housing, the one enters the other, so releasing the expanding force on the housing which then returns to its original size. In so doing the rubber rings are compressed between the inner periphery of the cylindrical housing and the three surfaces of each of the grooves in which they are contained, thus making the end pieces 19 not only stable in a locked position but liquidtight.

Entry in the first instance of the annular end piece 19 into the open end of the cylindrical housing 11 may be aided by the formation of a suitable internal chamfer 29, at the extremity of the cylindrical housing, and a corresponding external chamfer on the leading edge of the peripheral ridge 25 on the annular end piece.

The deformation of the resilient rings 28 is such that the friction thereby created between the cylindrical housing 11 and the annular end piece 19 is sufficient to prevent relative angular displacement under the conditions of vibration and changes of temperature which occur when the motor is operated.

I claim:

1. A sealed electric motor having a stator enclosed within a cylindrical housing and a tubular lining sleeve, a liquidtight seal therefor comprising annular end pieces one for each end, for insertion between said housing and said sleeve, internal grooves in said housing wall one adjacent each end thereof, a radial flange on said end pieces adapted to engage and lock in said internal grooves, spaced peripheral grooves in said end pieces one of which is in juxtaposition with said flange, adapted to receive resilient packing rings and having a depth less than the diameter of the section of said rings, and resilient packing rings for said peripheral grooves.

2. A sealed electric motor having a stator enclosed within a cylindrical housing and a tubular lining sleeve, a liquidtight seal therefor comprising annular end pieces for insertion between said housing and said sleeve with one for each end thereof, internal grooves in said housing wall with one adjacent each end thereof, a radial flange on said end pieces flush with the internal surface thereof and adapted to engage and lock in said internal grooves, spaced peripheral grooves one of which immediately adjoins said flange in said end pieces adapted to receive resilient packing rings and having a depth less than the diameter of the section of said rings, and resilient packing rings for said peripheral grooves.

3. A sealed electric motor having a stator enclosed within a cylindrical housing of a material having a high yield point and a tubular lining sleeve, a liquidtight seal therefor comprising annular end pieces for insertion between said housing and said sleeve one being placed at each end, internal grooves in said housing wall with one adjacent each end thereof, an internal chamfer at each end of said housing, a radial flange on each of said end pieces adapted to engage and lock in said internal grooves, said flanges being chamfered on their internal perimeters to conform with the chamfering of said housing, spaced peripheral grooves in said end pieces one of which is in juxtaposition with said radial flange adapted to receive resilient packing rings and having a depth less than the diameter of the section of said rings, and resilient packing rings for said peripheral grooves.

References Cited in the file of this patent

UNITED STATES PATENTS

| | | |
|---|---|---|
| 2,140,106 | Cox et al. | Dec. 13, 1938 |
| 2,310,422 | Gold | Feb. 9, 1943 |
| 2,649,048 | Pezzillo et al. | Aug. 18, 1953 |
| 2,703,371 | Wightman | Mar. 1, 1955 |